United States Patent Office 2,964,159
Patented Dec. 13, 1960

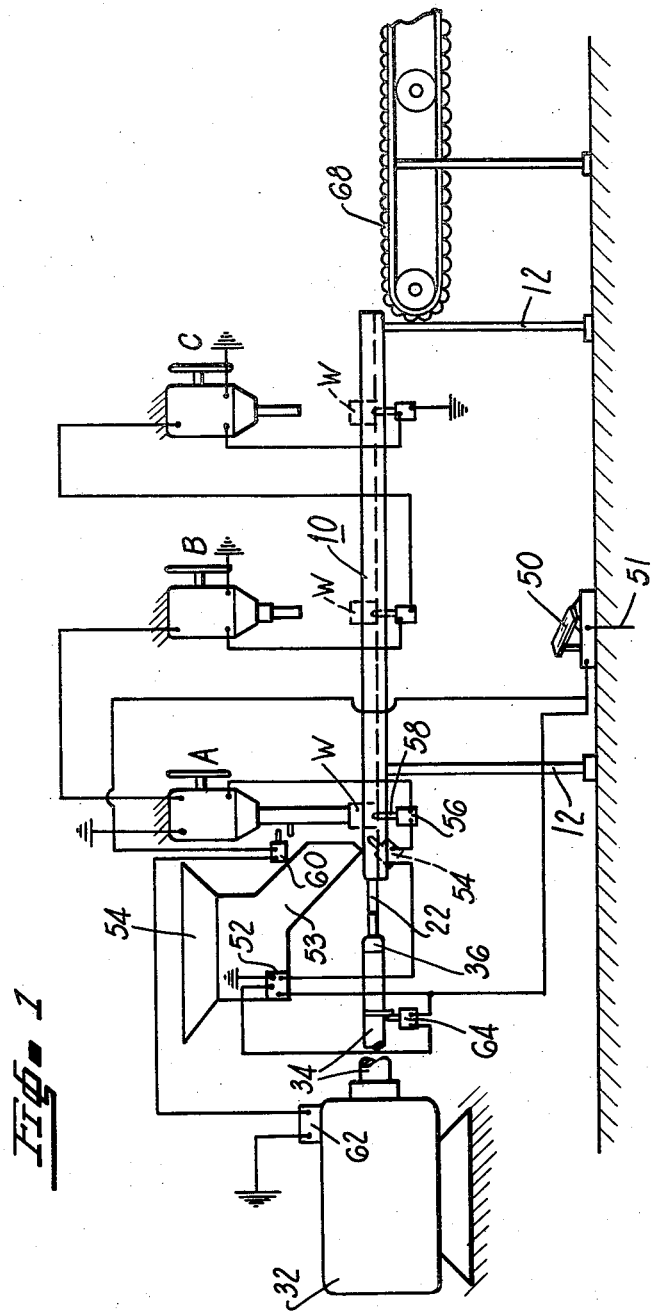

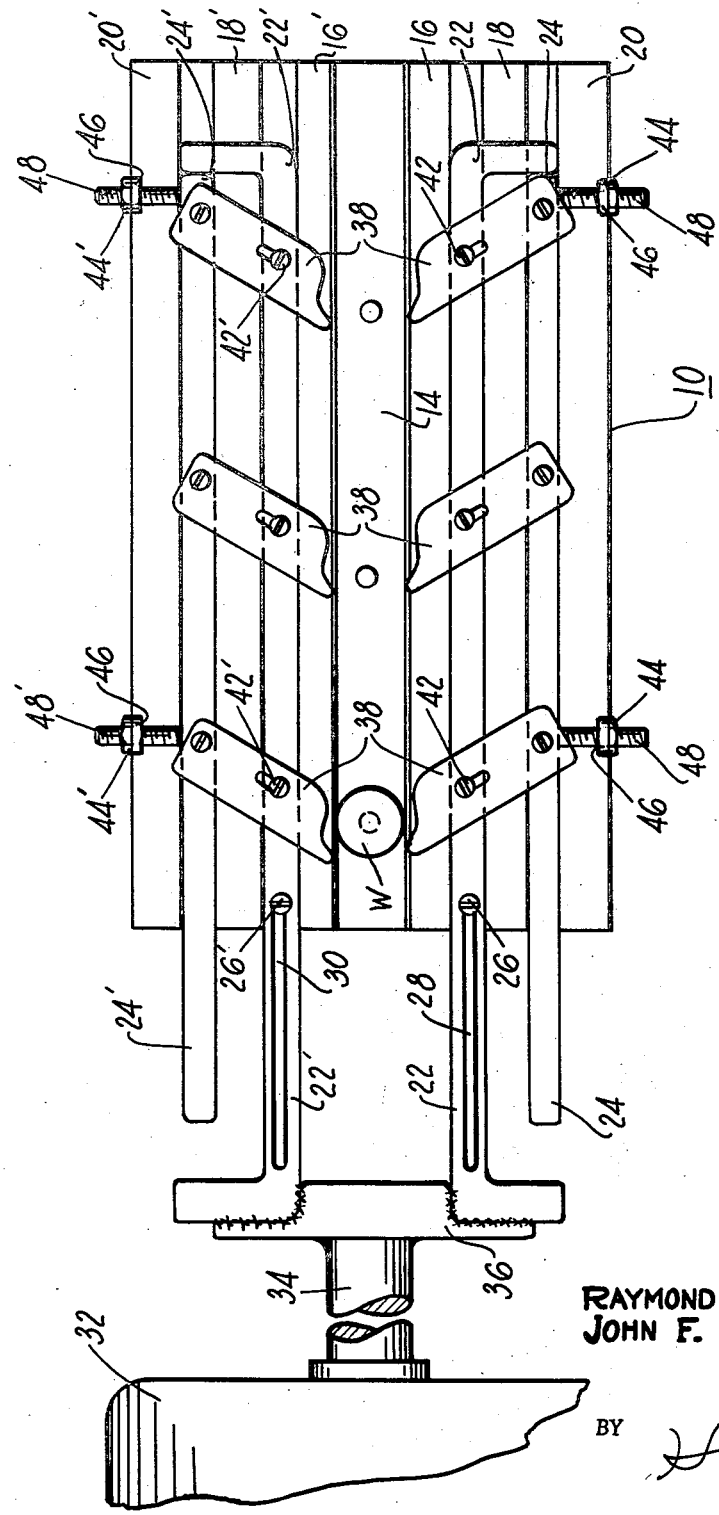

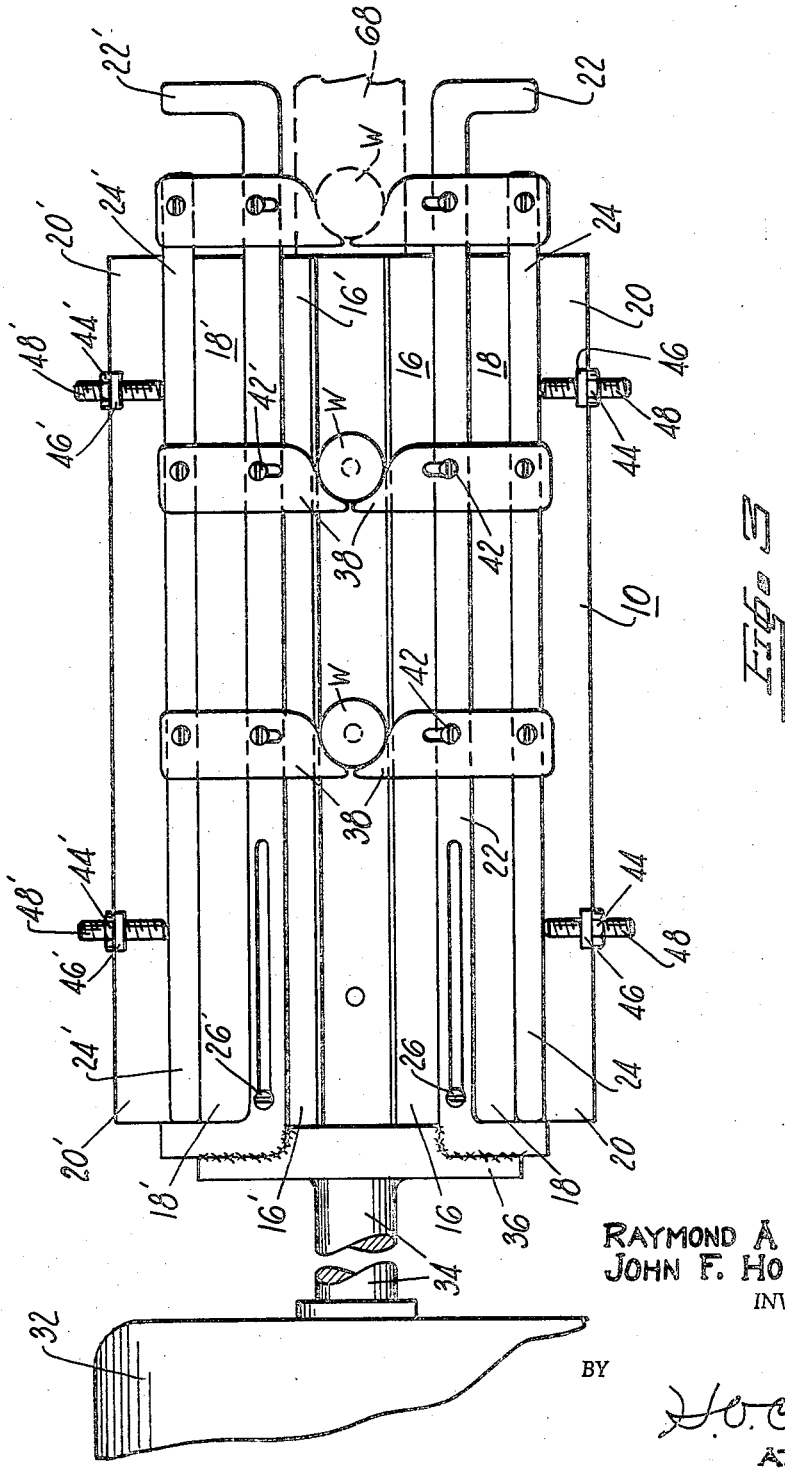

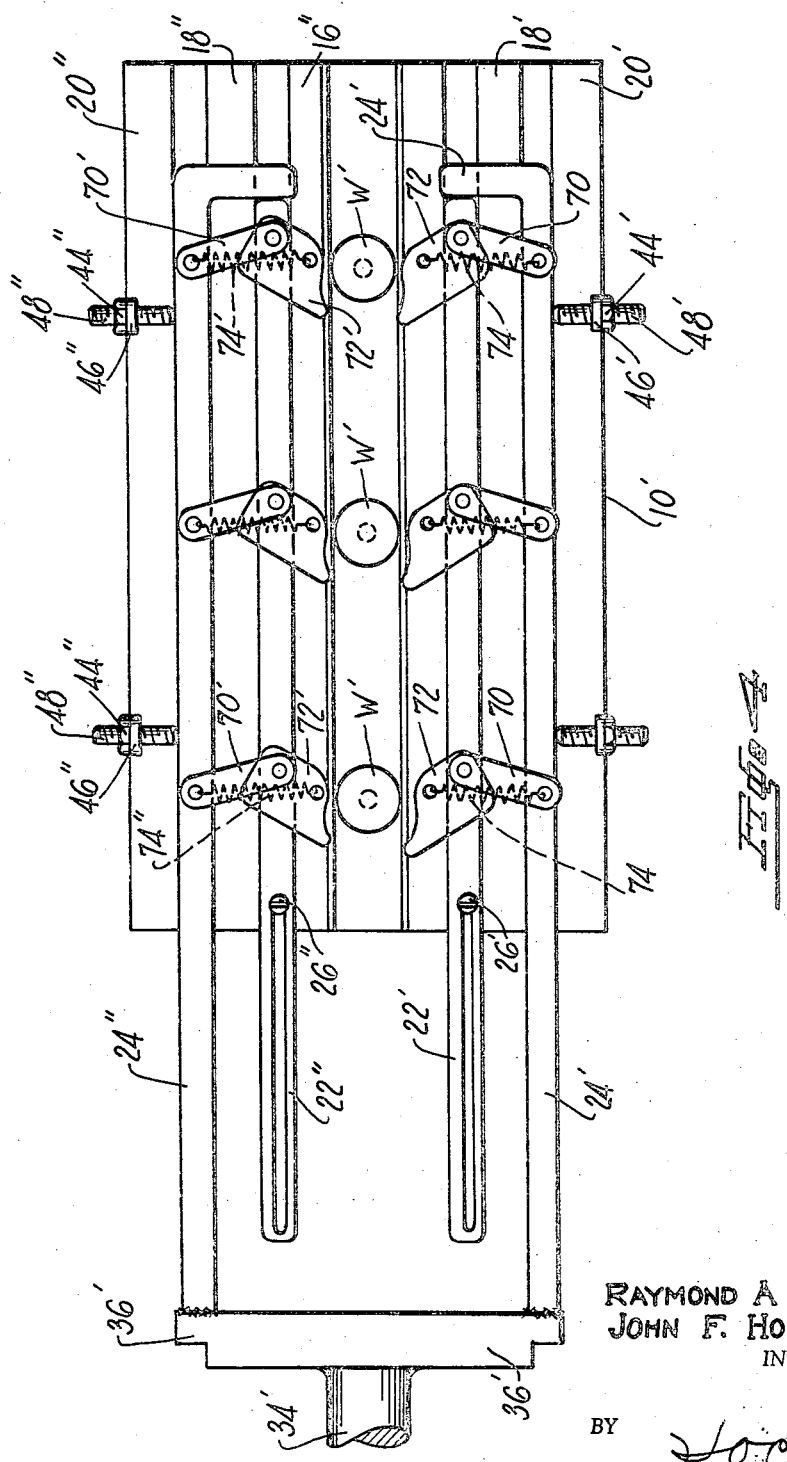

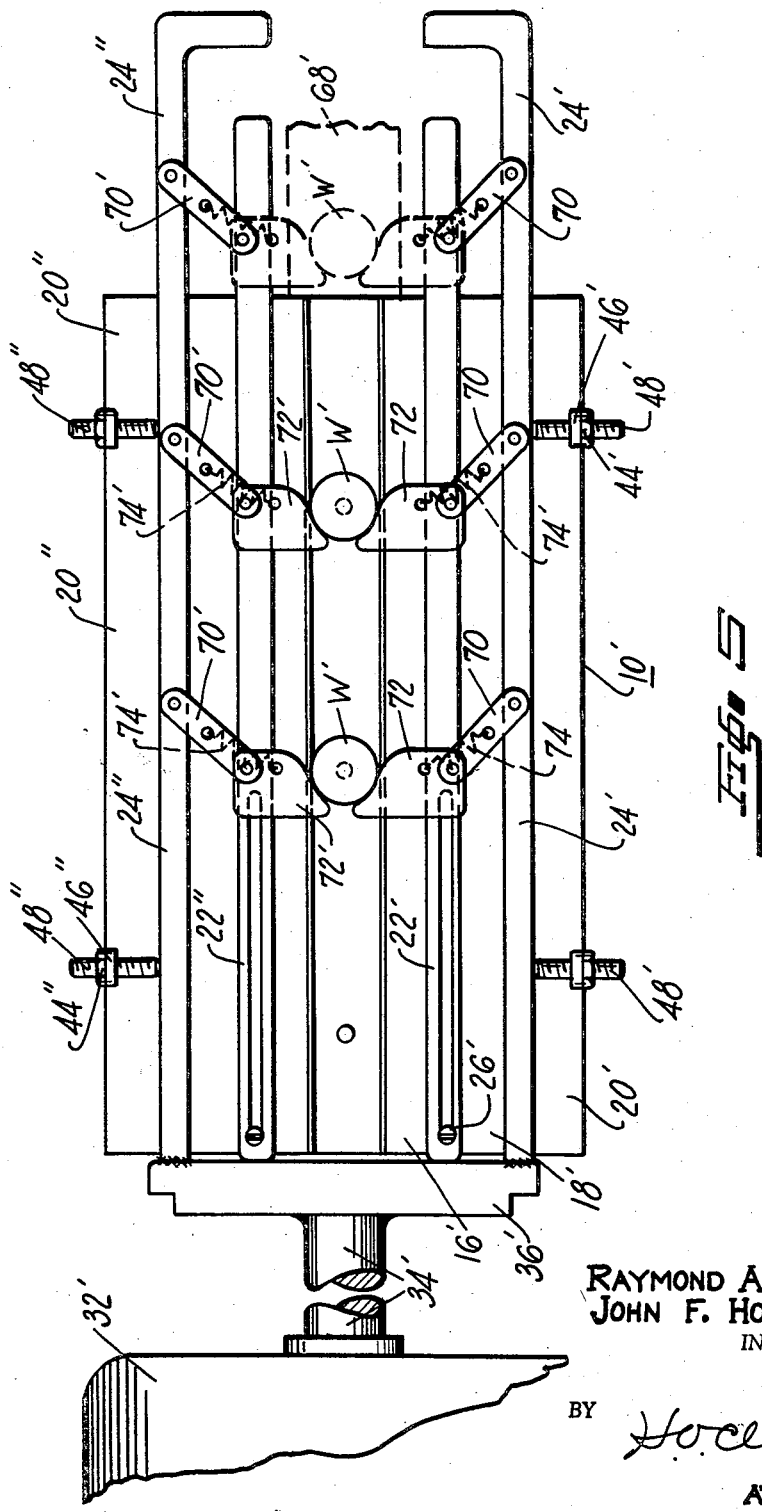

2,964,159

CONVEYOR

Raymond A. Boyer, Sr., and John F. Horvath, South Bend, Ind., assignors to The Bendix Corporation, a corporation of Delaware Filed May 4, 1959, Ser. No. 810,923

5 Claims. (Cl. 198—19)

This invention relates in general to automatic feed mechanism and in particular to a so-called transmat unit of said mechanism.

It is an object of our invention to provide an automatically operated mechanism for effecting a plurality of processing operations upon workpieces of a certain type, say a certain cast slug, said mechanism including an intermittently operable power operated transmat unit for transferring the workpieces being processed from one station to another of plurality of stations of the mechanism.

The aforementioned intermittently operable power operated transmat unit constitutes the essence of our invention and it is a feature of said invention that the transmat unit and cooperating mechanism is attended to by but one attendant, his principal duties being to keep a hopper of the mechanism full of workpieces and to, in general, oversee the operation of said mechanism.

An important object of our invention lies in the provision, in an automatically operable mechanism for successively performing a plurality of different operations upon workpieces of a certain type of a power operated transmat unit conveniently mounted adjacent spaced apart work stations of the mechanism and intermittently operable to move, from station to station and lastly into say a storage bin or other receptacle, the workpieces being processed.

Other objects of our invention and desirable details of construction of parts will become apparent from the following detailed description of certain illustrative embodiments of the invention, taken in conjunction with the accompanying drawings illustrating said embodiments, in which:

Figure 1 is a diagrammatic view, in side elevation, of the feed mechanism including our invention, that is the transmat unit;

Figure 2 is a top plan view of one embodiment of the transmat unit constituting our invention, said unit being shown in its off position;

Figure 3 is a view, similar to Figure 2, showing the transmat in its active position, that is, position during the operation of moving the workpieces;

Figure 4 is a top plan view, similar to Figure 2, showing another embodiment of our transmat unit in its off position; and Figure 5 is a top plan view, similar to Figure 3, showing the mechanism of Figure 4 in its active position.

There is disclosed, in Figures 1, 2 and 3 of our drawings, a preferred embodiment of the so-called transmat unit constituting the principal feature of our invention. Describing this embodiment and the mechanism associated therewith a rectangular shaped platform 10 of steel or other suitable durable material, Figure 2, is horizontally mounted on vertically extending support members 12. The platform is positioned immediately beneath work stations A, B and C the hereinafter described workpieces being located on the platform in position to be processed by the mechanism of said stations. These workpieces are indicated by the letter W.

As is disclosed in Figures 2 and 3 a workpiece receiving channel member 14 extends lengthwise of the platform and on both sides of said member there are relatively narrow metal strips 16, 18 and 20, and 16', 18' and 20', fixedly secured to the platform. These strips are spaced apart as is disclosed in Figures 2 and 3. The two spaces between the strips on each side of the channel provide ways for slidable gauge slides 22 and 24 and 22' and 24'. Pins 26 and 26', detachably mounted in the platform, provide stop and guide members for the slides 22 and 22' respectively; for said pins 26 and 26' are positioned, respectively, in slots 28 and 30 in the slides 22 and 22' respectively. The pins function both as guide members and stop members when a double acting fluid pressure motor 32 is energized to move the slides 22 and 22'. The power element of the motor 32, not shown, is connected, by a rod 34, to a cross member 36 which is fixedly connected to the members 22 and 22'.

Pairs of feeder arms 38, spaced, for example, say six feet apart, are pivotally mounted at their outer ends on the slides 24 and 24' upon pins detachably mounted in said slides; and pins 42 and 42', detachably mounted on the slides 22 and 22' adjacent the inner ends of the arms 38, extend through slots in the feeder arms. The arms 38, at their inner ends, have a configuration adapted to partly surround the workpieces W. Nuts 44 and 44', fixedly secured to the platform 10 at 46, serve as mountings for bolts 48 and 48' which serve as guides for the slides 24 and 24'. The bolts are threadedly mounted in the nuts. The slides may also have a dovetail fit with gauge slides on the platform. The platform is, of course, made long enough to support the particular number of pairs of feeder arms desired; and these pairs of arms are spaced apart sufficiently to be positioned under the work stations. These stations may be say six feet apart; or they may be sixteen feet apart.

Describing now the operation of the mechanism disclosed in Figures 1, 2 and 3 and incidentally completing the description of this mechanism, the attendant, to initiate the operation of the mechanism, depresses a foot operated treadle 50, Figure 1. This operation closes a switch, not shown, which results in the operation of a control 52 which opens a gate, not shown, in a hopper 54. The undisclosed switch under the treadle is wired, by a wire 51, to a source of electricity. The hopper 54 is filled with workpieces, say cylinder pistons, cams, or castings of some kind. We will assume that the workpiece is a casting and that the machines at the work stations A, B and C perform, respectively, the operations of (1) placing a dimple in the casting (2) placing a slug in the dimple and (3) effecting an extrusion operation upon the casting. The operations might however be, say, an embossing operation, an assembling of two parts and lastly an extrusion through a die operation. It will also be assumed that before the treadle 50 is depressed to initiate an operation of the mechanism that the slides, feeder arms, and other transmat parts are in their off position disclosed in Figure 2 of the drawings.

Now when the gate in the hopper is opened a workpiece W will slide down a chute 53 of the hopper and in doing so will close a microswitch 54. The closure of this switch results in (1) the energization of a solenoid 56 and (2) the energization of the work station A to initiate its operation of placing a dimple in the workpiece. An armature 58 of the solenoid 56 fits into a recess on the bottom of the workpiece thereby holding the latter in position while the dimpling operation is being effected.

After the above described dimpling operation has been completed the work station mechanism, in retracting, actuates a switch 60 which serves to energize a control 62; and this operation results in the energization of the motor 32 to move the rod 34 to the right, Figure 2. The resulting rightward movement of the slides 22 and 22' results in a clockwise rotation of the feeder arms or fingers 38 about their pivots, Figure 2; and this operation serves to bodily move the workpiece W under station A, Figure 1, to the right to the next station, that is station B. At this station the parts of the transmat mechanism have assumed the positions disclosed in Figure 3. It is to be noted that in moving to the right the slides 22 and 22' bodily pick up the slides 20 and 20' whereupon both pairs of slides of the transmat move as a unit until the left end of the slots in the slides 22 and 22' strike the stops 26 and 26', Figure 3.

The control 62 of the motor 32 is then automatically operative to energize said motor to return the slides to the left to the off position disclosed in Figure 2; and at the tail end of this operation a control 64 operates to again open the gate of the hopper to permit another workpiece W to slide down the chute 53. In other words another cycle of operations is initiated however this time the station B works concurrently with a second working of the station A, the station B performing the operation of, say, inserting a slug in the dimple.

The workstation C will eventually come into operation and after the operation of this station has been completed the next operation of the mechanism will result in a pushing of the completed workpiece off onto a conveyor 68; or the completed workpiece may be pushed by the feeder arms into a basket, not shown.

It is to be particularly noted that once the operation of the work stations and transmat is initiated there is no stopping until either the hopper 54 is empty or there is a failure of a part of the power mechanism, say the switch 54. This failure will occur if a workpiece is not placed in location to be processed. All that the attendant need do is to keep the hopper filled with workpieces and in general oversee the operation of the entire mechanism watching for failure of operation of parts. It is also to be particularly noted that our invention is limited to the transmat disclosed in Figures 2 to 5 inclusive; for the workpieces may be manually positioned in place to be initially processed by station A and then moved, by our transmat mechanism, on to the next station B; and eventually to the conveyor 68.

In our invention the particular pivotal mounting of the feeder arms and their cooperation with the slide structure of the transmat insures a moving of the workpiece to the right, Figure 2; and the reverse bodily movement of the slides 22 and 22' results in a counterclockwise rotation of the feeder arms back to the position disclosed in Figure 2.

There is thus provided, by the mechanism of our invention, a fully automatic mechanism for successively effecting a plurality of different operations upon a workpiece, the transmit unit constituting our invention serving to simultaneously move, from station to station, a plurality of workpieces; whether they be five feet or fifteen feet apart; and with our transmat the workpiece, when completed, is moved onto a conveyor to be moved to, say, a storage bin.

In Figures 4 and 5 parts duplicating the same parts in Figures 2 and 3 are given the same reference numerals with the addition of a prime; and the parts that are primed in Figures 2 and 3 are given a double prime in Figures 4 and 5.

Describing now the mechanism of Figures 4 and 5 as it differs from that of Figures 2 and 3 the feeder arm mechanism of Figures 4 and 5 includes link members 70 and 70' pivotally connected at one of their ends to the slides 24' and 24'' respectively; and at their other ends the link members are pivotally connected to the slides 22' and 2''. Links 72 and 72', shaped at one of their ends to fit around a portion of the workpiece W', are pivotally mounted on the slides 22' and 22'', respectively; and said links are also pivotally connected to the links 70 and 72; all as is disclosed in Figures 4 and 5. Springs 74 and 74', connected at one of their ends to the pivotal mounting of the links 72 and 72' and at their other ends to the pivotal mounting of the links 70 and 70' on the slides 24' and 24'', serve, with a longitudinal bodily movement of the slides 24' and 24'' with respect to the slides 22' and 22'', to angularly rotate the springs past dead center and in doing so rotate the links 72 and 72'.

There is thus provided, in the transmat of Figures 4 and 5, a mechanism which will, with the energization of the fluid pressure motor 32', intermittently move the workpieces from station to station and then deposit them upon the conveyor 68'.

While the preferred embodiment of the invention has been described in considerable detail, we do not wish to be limited to the particular construction shown which may be varied within the scope of the invention, and it is the intention to cover hereby all adaptations, modifications and arrangements thereof which come within the practice of those skilled in the art to which the invention relates.

We claim:

1. In an automatically operative power operated mechanism for successively performing a plurality of different operations upon workpieces of a certain type, said mechanism including a plurality of spaced apart work stations, power means intermittently operable to move workpieces being processed from one of the aforementioned stations to another and eventually into a receptacle, said power means including a rectangular shaped workpiece supporting platform positioned adjacent the several stations, workpiece moving feeder means including a pair of relatively movable rectangular shaped members slidably mounted on said platform on opposite sides of said workpieces, a plurality of spaced apart workpiece actuating feeder arms pivotally mounted on each pair of relatively movable members, a pressure differential operated double acting motor operable to actuate one of said relatively movable members on each side of said workpieces to thereby pivotally actuate said feeder arms about their respective mountings on the other of said relatively movable members into engagement with their respective workpieces whereupon each of said pairs of relatively movable members is actuated to move the workpieces on the platform from one station to another and then return said feeder means to its off position, and means mounted on said platform and engageable with said workpieces for rendering the power means inoperative in the event that said workpieces are improperly positioned relative to their associated work stations.

2. In an automatically operative power operated mechanism for successively performing a plurality of different operations upon workpieces of a certain type, said mechanism including a plurality of spaced apart work stations, power means intermittently operable to move workpieces being processed from one of the aforementioned stations to another and eventually into a receptacle, said power means including a rectangular shaped workpiece supporting platform positioned adjacent the several stations, workpiece moving feeder means including a pair of relatively movable rectangular shaped members slidably mounted on said platform on opposite sides of said workpieces, a plurality of spaced apart workpiece actuating feeder arms pivotally mounted on each pair of said relatively movable members; a lost motion connection between said relatively movable members whereby one of said relatively movable members is free to move through a predetermined distance before engaging the other of said relatively movable members, and a pressure differential operated motor operable to actuate said one of the relatively movable members through said predetermined distance to thereby effect pivotal movement of said feeder arms about their respective mountings on the other of said relatively movable members into engagement with workpieces and subsequent engagement of said relatively movable members whereupon said relatively movable members are actuated simultaneously to move the workpieces on the platform from one station to another and then return said feeder means to its off position.

3. In an automatically operative power operated mechanism for successively performing a plurality of different operations upon workpieces of a certain type, said mechanism including a plurality of spaced apart work stations, power means intermittently operable to move workpieces being processed from one of the aforementioned stations to another and eventually into a receptacle, said power means including a fixedly mounted workpiece supporting platform positioned immediately beneath the mechanism of the aforementioned work stations, workpiece moving feeder means, including a pair of spaced gauge slides slidably mounted in the platform and movable longitudinally relative to one another, lost motion means operatively connecting said pair of spaced gauge slides for limiting the relative motion longitudinally therebetween, and motor means for actuating the gauge slides to first move one of said gauge slides to effect engagement of said feeder means with said workpieces whereupon said lost motion is taken up and said pair of gauge slides are actuated as a unit to effect movement of the workpieces on the platform from one work station to another and then return said feeder means to its off position by reversing the direction of movement of said one of the gauge slides to effect disengagement of said feeder means from said workpieces whereupon said lost motion is again taken up and said pair of gauge slides are returned to their initial position.

4. In an automatically operative power operated mechanism for successively performing a plurality of different operations upon workpieces of a certain type, said mechanism including a plurality of spaced apart work stations, power means intermittently operable to move workpieces being processed from one of the aforementioned stations to another and eventually into a receptacle, said power means including a fixedly mounted workpiece supporting platform positioned immediately beneath the mechanism of the aforementioned work stations, workpiece moving feeder means including a pair of spaced gauge slides slidably mounted in the platform and movable longitudinally relative to one another, one of said spaced gauge slides being longer than the other and having end portions spaced from and adapted to engage the ends of the other of said gauge slides to thereby provide a lost motion connection, pairs of feeder arms pivotally mounted on said slides, and motor means for actuating the longer gauge slide through said lost motion thereby causing said pairs of feeder arms to pivot about the other of said gauge slides and engage said workpieces, said other gauge slide being subsequently engaged by one of said end portions whereupon said pair of gauge slides is actuated as a unit to move the workpieces on the platform from one work station to another and then return said feeder means to its off position by reverse motion of said longer gauge slide thereby causing said feeder arms to pivot out of engagement with said workpiece and subsequent engagement of the other of said end portions with said other gauge slide to thereby return the pair of gauge slides as a unit to their initial position.

5. In an automatically operative power operated mechanism for successively performing a plurality of different operations upon workpieces of a certain type, said mechanism including a plurality of spaced apart work stations, power means intermittently operable to move workpieces being processed from one of the aforementioned stations to another and eventually into a receptacle, said power means including a workpiece supporting platform, a plurality of spaced strips of solid material on said platform, said strips, by virtue of their being spaced, providing ways, a plurality of gauge slides slidably mounted in said ways and movable longitudinally relative to one another, workpiece actuating feeder arms pivotally mounted on said slides, and power means for actuating said gauge slides to, by virtue of the relative motion between said gauge slides cause the feeder arms to pivot into engagement with said workpieces and subsequently move the workpieces on the platform from one work station to another whereupon the power means is operative to return the gauge slides with their feeder arms to their off position.

References Cited in the file of this patent

UNITED STATES PATENTS

| | | |
|---|---|---|
| 1,560,373 | Birnstock | Nov. 3, 1925 |
| 2,542,243 | Gedris | Dec. 20, 1951 |